United States Patent [19]

Hiyama et al.

[11] 3,929,712
[45] Dec. 30, 1975

[54] VINYL CHLORIDE TYPE RESIN COMPOSITION CONTAINING A LUBRICANT

[75] Inventors: Osamu Hiyama; Kazuo Ito, both of Wakayama, Japan

[73] Assignee: Kao Soap Co., Ltd., Tokyo, Japan

[22] Filed: July 23, 1974

[21] Appl. No.: 491,038

[30] Foreign Application Priority Data
July 24, 1973 Japan............................. 48-83312

[52] U.S. Cl........ 260/31.8 B; 260/31.8 C; 264/300; 264/211
[51] Int. Cl.²... B29F 3/00; C08K 5/11; C08L 27/06
[58] Field of Search....... 260/31.8 B, 31.8 C, 484 P; 252/56 S, 56 R; 264/300, 211

[56] References Cited
UNITED STATES PATENTS

| | | | |
|---|---|---|---|
| 2,897,176 | 7/1959 | Rocky et al. | 264/300 |
| 3,341,554 | 9/1967 | Murray et al. | 260/31.8 B |
| 3,442,837 | 5/1969 | Brotz et al. | 264/300 |
| 3,640,828 | 2/1972 | Brotz et al. | 252/56 S |
| 3,691,219 | 9/1972 | Boussely | 264/300 |
| 3,793,274 | 2/1974 | Hiyama et al. | 264/300 |

*Primary Examiner*—Allan Lieberman
*Attorney, Agent, or Firm*—Woodhams, Blanchard and Flynn

[57] ABSTRACT

A vinyl chloride type resin composition is disclosed which comprises 100 parts by weight of a vinyl chloride type resin and, incorporated therein as a lubricant, 0.05 to 2.0 parts by weight of a dialkyl ester of citric acid having the formula:

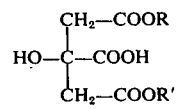

wherein
R and R' are alkyls having 12 to 22 carbon atoms, with the proviso that the sum of the number of carbon atoms of R plus R' is within the range of 26 to 44.

6 Claims, 1 Drawing Figure

| RATING MARKS | STATE OF RESINS |
|---|---|
| 5 | 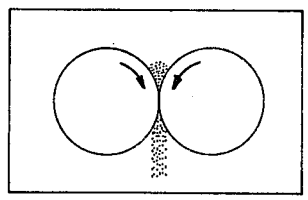 |
| 4 | 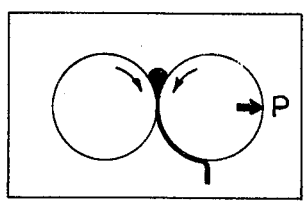 |
| 3 | 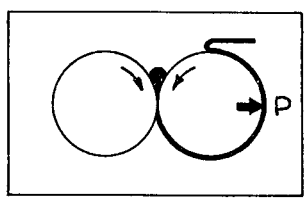 |
| 2 | 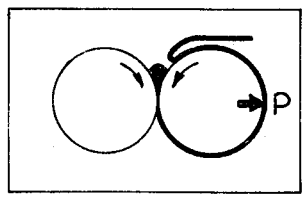 |
| 1 | 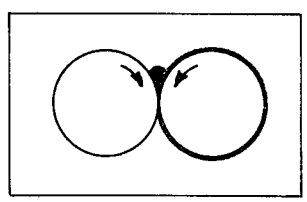 |

VINYL CHLORIDE TYPE RESIN COMPOSITION CONTAINING A LUBRICANT

BACKGROUND OF THE INVENTION

1. Field of the Invention

This invention relates to a vinyl chloride type resin composition in which the lubricating properties and/or moldrelease characteristics are highly improved by incorporating therein a small amount of a dialkyl ester of citric acid in which the sum of the number of carbon atoms of the two alkyl groups is within the range of from 26 to 44.

2. Description of the Prior Art

In general, a heat stabilizer is incorporated into vinyl chloride type resins prior to subjecting the resin to a molding process. Most of the known heat stabilizers more or less have a lubricating effect, but in the practical molding and processing of these resins, a sufficient lubricating effect is not manifested by the use of the heat stabilizer alone. Accordingly, in order to impart sufficient lubricating properties to the resins, additional lubricants are usually employed.

As lubricants for vinyl chloride resins, there have heretofore been employed monobasic higher fatty acids, their esters, their amides such as methylene-bis-stearamide, ketone waxes such as stearone, and other various waxes. However, most of these conventional lubricants are dissolved excessively in the resins under high-temperature and prolonged processing conditions; and it thus becomes impossible for a lubricating film to form between the resin and the metal surface of the molding machine, with the result that a sufficient mold release effect is not obtained. This is a serious defect of the conventional lubricants for vinyl chloride type resins.

SUMMARY OF THE INVENTION

We have discovered that when a dialkyl ester of citric acid having the following formula

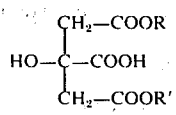

wherein R and R' each is alkyl having 12 to 22 carbon atoms, with the proviso that the sum of the number of carbon atoms of R plus R' is within the range of 26 to 44,
is incorporated as a lubricant into a vinyl chloride type resin, in an amount of 0.05 to 2.0 parts by weight of said dialkyl ester per 100 parts by weight of the resin, and the resulting resin composition is molded and processed, even under high-temperature and prolonged conditions the resin has good durable lubricating properties and excellent release characteristics can be obtained.

The dialkyl citrates used in this invention are typically prepared by reacting 1 mole of citric acid with 2 moles of a monohydric alkyl alcohol (alkanol) having 12 to 22 carbon atoms by dehydration esterification according to a conventional method. The dialkyl citrate substance used in this invention need not be pure, and even if it contains small amounts of mono-esters and tri-esters, the lubricating effect is not degraded at all. Under some esterification conditions, there is obtained a reaction product which contains small amounts of unreacted citric acid and unreacted monohydric alcohol, but such unreacted compounds need not be removed and such reaction product can be used as it is, as long as the amounts thereof are not excessive. Thus, as the lubricant, there is used a reaction product containing at least 90 weight percent of dialkyl citrates of the above formula and the balance is one or more of monoalkyl citrates, trialkyl citrates, citric acid and unreacted alkanol.

In the dialkyl citrate used as a lubricant in this invention, it is preferred that the sum of the number of carbon atoms of the two alkyl groups is within the range of 26 to 44, especially 30 to 40.

The two alkyl groups need not always contain the same number of carbon atoms. In case the sum of the number of carbon atoms consituting the alkyl groups is smaller than 26, the desired lubricating effect is not obtained, and when the sum of the number of carbon atoms is larger than 44, the lubricant is undesirably like paraffin wax, and it is difficult to obtain starting materials for such lubricant, which is an industrial economic disadvantage.

The dialkyl citrate used in this invention can easily be prepared according to conventional methods. An example of the preparation of distearyl citrate is illustrated below.

A 2 liter-capacity, four-neck flask was charged with 276 g of industrial grade citric acid (containing one molecule of water of crystallization) and 786 g of stearyl alcohol (having a hydroxyl value of 205), and they were reacted at 170°C. for about 2 hours under agitation, while blowing in nitrogen gas and while removing water formed by the reaction from the reaction system. After termination of the reaction, the reaction mixture was cooled to obtain 1000 g of distearyl citrate in the form of a solidified product. The ester product was found to have a neutralization value of 79 (the calculated theoretical value being 80) and a saponification value of 240 (the calculated theoretical value being 241).

Resins into which the dialkyl ester of citric acid is incorporated as a lubricant are the so-called vinyl chloride type resins such as polyvinyl chloride, vinyl chloride/vinyl ester copolymers, vinyl chloride/vinyl ether copolymers, vinyl chloride/vinylidene chloride copolymers, vinyl chloride/lower olefin copolymers and the like. These resins contain at least 50 weight percent of vinyl chloride units, and the balance is one or more monomers copolymerizable with vinyl chloride.

The dialkyl ester of citric acid can also be incorporated as a lubricant in vinyl chloride resin blends composed of such vinyl chloride type resin as the major component and including as a minor component such polymers as an MBS resin (methyl methacrylate/butadiene/styrene resin), an ABS resin (acrylonitrile/butadiene/styrene), a styrene/acrylonitrile copolymer, a styrene/methyl methacrylate copolymer, polystryene and the like.

The vinyl chloride resin is thus a resin in which vinyl chloride constitutes all or a major portion thereof. In the copolymers, the vinyl chloride moiety constitutes at least 50 percent of the total resin, and in the blends, the vinyl chloride component constitutes at least 80 percent of the total resin.

The amount of the dialkyl citrate used in this invention varies depending on the kind of desired molded article, but good results are generally obtained when the lubricant is incorporated in an amount of 0.05 to 2.0 parts by weight of lubricant, per 100 parts by weight of the resin used. If the amount of the lubricant is less than 0.05 part by weight, no lubricating effect is obtained, and if the amount of the lubricant is larger than 2.0 parts by weight, no particular increase of the lubricating effect can be obtained by increasing the amount of the lubricant, but troubles are caused by excessive compounding.

Thus, in accordance with this invention, there is provided an advantageous processing method for vinyl chloride type resins which have durable lubricating characteristics capable of resisting high temperature processing conditions, as are now demanded in the fields of calendar processing and extrusion procession.

According to this invention, since the resin does not stick to the metal surfaces of the processing machine, the processed resin can easily be released and hence, the processing can be accomplished very smoothly.

The properties of lubricants can be evaluated according to methods using various plastometers. However, although such plastometer methods can precisely evaluate the inernal lubricating activity, which is one of the functions of the lubricant, the important release effect cannot be evaluated at all by such methods.

In the Examples given hereinafter, the following test roll method was chosen as a test method in which the release effect is manifested most directly.

Processing is conducted by rotating a pair of rolls analogous to calendaring rolls. A fused sheet-like resin wound on one of the rolls is cut at a prescribed processing position. The release effect is evaluated by assigning rating marks depending on the position where the cut resin is released from the roll and on the state of the resin. The relation between the rating marks and the states of the resin is as shown below:

| Rating Mark | State of Resin |
|---|---|
| 5.0 | Resin is not fused on the roll, and the initial powdery form is not changed. |
| 4.0 | Resin is fused, and when the sheet-like resin wound on the roll surface is cut at a processing position, the cut portion naturally hangs down and the resin is released from the lowermost portion of the roll. |
| 3.0 | Resin is fused, and when the sheet-like resin wound on the roll surface is cut at a processing position, the cut portion naturally curls upwardly and the resin is released from the uppermost portion of the roll. |
| 2.0 | Resin is fused, and when the sheet-like resin wound on the roll surface is cut at a processing position, the cut portion naturally curls upwardly and the resin is released from the vicinity of roll bank (point where fused resin is stored). |
| 1.0 | Resin is fused, and when the sheet-like resin wound on the roll surface is cut at a processing position, the resin is not released from the roll. |

In order to obtain lubricating properties and release characteristics necessary for prolonged stable processing of the resin, the resin should have a rating mark in the range of from 3.3 to 4.0, and a mark close to 4.0, for example, 3.5 to 3.8, is preferred. Namely, if a lubricant gives marks within the range of from 3.3 to 4.0 to a vinyl chloride type resin, it can be said that the lubricant exhibits a good lubricating effect.

It will be understood that the resin composition can include additional ingredients, such as stabilizers, pigments, fillers, etc. in the amounts conventionally used in polyvinyl chloride resin compositions.

This invention will now be further described by reference to the following illustrative Examples.

EXAMPLE 1

A resin composition was melted, rolled and wound on heated test rolls (chilled-steel rolls) having a diameter of 6 inches, a length of 12 inches, a rotation (rpm) ratio of 1/1.1, a clearance of 0.3 mm and an electrially heated surface temperature of 190°C. After a prescribed period at time had passed, the degree of sticking of the resin on the roll surface was examined and evaluated according to the above-mentioned test method.

A resin composed solely of polyvinyl chloride and a blend of this polyvinyl chloride resin and an MBS resin (methyl methacrylate-butadiene-styrene resin) were chosen as test resins, and various lubricants were incorporated into these resins to prepare samples. Each sample was fed to the rolls and tested according to the above method. The polyvinyl chloride resin used was one having a degree of polymeization of about 800, which has been prepared by the suspension polymerization method.

The test results are shown in Tables 1, 2 and 3.

BRIEF DESCRIPTION OF THE DRAWING

The attached drawing is a sketch showing the relation between the rating marks and the states of the resin in the test roll method for evaluating the roll release effect. The point P indicated by an arrow is the processing position on the roll wound by the fused resin and the cutting was made by using a spatula.

Table 1

| Composition (g) | Comparative Samples | | | | | | Samples of This Invention | | |
|---|---|---|---|---|---|---|---|---|---|
| | No. 1 | No. 2 | No. 3 | No. 4 | No. 5 | No. 6 | No. 7 | No. 8 | No. 9 |
| vinyl chloride resin | 100 | 100 | 100 | 100 | 100 | 100 | 100 | 100 | 100 |
| SNT-701F* (stabilizer) | 3 | 3 | 3 | 3 | 3 | 3 | 3 | 3 | 3 |
| stearic acid | 0.6 | | | | | | | | |
| butyl stearate | | 0.6 | | | | | | | |
| calcium stearate | | | 0.6 | | | | | | |
| ethylene-bis-stearoamide | | | | 0.6 | | | | | |
| di-(butyleneglycol) montanite | | | | | 0.6 | | | | |
| tristearyl citrate | | | | | | 0.6 | | | |
| dibehenyl citrate | | | | | | | 0.6 | | |
| distearyl citrate | | | | | | | | 0.6 | |
| myristyl lauryl citrate | | | | | | | | | 0.6 |
| Roll-Release Characteristics (rating mark) | Comparative Samples | | | | | | Samples of This Invention | | |

Table 1-continued

| Composition (g) | Comparative Samples | | | | | | Samples of This Invention | | |
|---|---|---|---|---|---|---|---|---|---|
| | No. 1 | No. 2 | No. 3 | No. 4 | No. 5 | No. 6 | No. 7 | No. 8 | No. 9 |
| | No. 1 | No. 2 | No. 3 | No. 4 | No. 5 | No. 6 | No. 7 | No. 8 | No. 9 |
| 3 minutes after forming a sheet on the roll | 3.4 | 3.0 | 3.4 | 3.0 | 3.3 | 3.3 | 3.8 | 3.8 | 3.5 |
| 5 minutes after forming a sheet on the roll | 3.2 | <3.2 | 3.2 | <3.2 | 3.1 | 3.1 | 3.8 | 3.8 | 3.5 |
| 10 minutes after forming a sheet on the roll | 3.0 | <3.0 | 3.1 | <3.0 | <3.0 | <3.0 | 3.7 | 3.7 | 3.4 |

*Stabilizer of the dioctyl-tin-S.S'-bis(iso-octylmercapto-acetate) type manufactured by Sankyo Yuki Kabushiki Kaisha Table 2

| Composition (g) | Comparative Samples | | | | | Samples of This Invention | | |
|---|---|---|---|---|---|---|---|---|
| | No. 10 | No. 11 | No. 12 | No. 13 | No. 14 | No. 15 | No. 16 | No. 17 |
| vinyl chloride resin | 93 | 93 | 93 | 93 | 93 | 93 | 93 | 93 |
| MBS resin[1] | 7 | 7 | 7 | 7 | 7 | 7 | 7 | 7 |
| CZ-11AJ[2] | 1.8 | 1.8 | 1.8 | 1.8 | 1.8 | 1.8 | 1.8 | 1.8 |
| epoxylated soybean oil | 0.6 | 0.6 | 0.6 | 0.6 | 0.6 | 0.6 | 0.6 | 0.6 |
| CH-55J[3] | 0.4 | 0.4 | 0.4 | 0.4 | 0.4 | 0.4 | 0.4 | 0.4 |
| stearic acid | 0.6 | | | | | | | |
| butyl stearate | | 0.6 | | | | | | |
| stearyl alcohol | | | 0.6 | | | | | |
| glycerin monostearate | | | | 0.6 | | | | |
| tristearyl citrate | | | | | 0.6 | | | |
| dibehenyl citrate | | | | | | 0.6 | | |
| distearyl citrate | | | | | | | 0.6 | |
| myristyl lauryl citrate | | | | | | | | 0.6 |
| Roll-Release Characteristics (rating mark) | Comparative Samples | | | | | Samples of This Invention | | |
| | No. 10 | No. 11 | No. 12 | No. 13 | No. 14 | No. 15 | No. 16 | No. 17 |
| 3 minutes after forming a sheet on the roll | 3.7 | 3.5 | 3.5 | 3.6 | 3.6 | 3.8 | 3.7 | 3.7 |
| 5 minutes after forming a sheet on the roll | 3.5 | 3.2 | 3.3 | 3.4 | 3.4 | 3.7 | 3.7 | 3.5 |
| 10 minutes after forming a sheet on the roll | 3.2 | 3.0 | 3.0 | 3.0 | 3.1 | 3.7 | 3.6 | 3.5 |

[1]trademark "BTA-X", MBS resin for reinforcing vinyl chloride resins, manufactured by Kureha Kagaku Kogyo Kabushiki Kaisha
[2]non-toxic Ca-Zn composite stabilizer approved by FDA, manufactured by Katsuta Kako Kabushiki Kaisha
[3]non-toxic organic composite phosphorous acid type stabilizer approved by FDA, manufactured by Katsuta Kako Kabushiki Kaisha Table 3

| Composition (g) | Comparative Samples | | | | | Sample of This Invention | | |
|---|---|---|---|---|---|---|---|---|
| | No. 18 | No. 19 | No. 20 | No. 21 | No. 22 | No. 23 | No. 24 | No. 25 |
| vinyl chloride resin | 100 | 100 | 100 | 100 | 100 | 100 | 100 | 100 |
| dibutyl tin maleate | 3 | 3 | 3 | 3 | 3 | 3 | 3 | 3 |
| stearic acid | 0.6 | | | | | | | |
| butyl stearate | | 0.6 | | | | | | |
| stearyl alcohol | | | 0.6 | | | | | |
| di-(butyleneglycol) montanite | | | | 0.6 | | | | |
| tristearyl citrate | | | | | 0.6 | | | |
| dibehenyl citrate | | | | | | 0.6 | | |
| distearyl citrate | | | | | | | 0.6 | |
| myristyl lauryl stearate | | | | | | | | 0.6 |
| Roll-Release Characteristics (rating mark) | Comparative Samples | | | | | Sample of This Invention | | |
| | No. 18 | No. 19 | No. 20 | No. 21 | No. 22 | No. 23 | No. 24 | No. 25 |
| 3 minutes after forming a sheet on the roll | <3.0 | <3.0 | <3.0 | 3.2 | 3.2 | 3.5 | 3.4 | 3.3 |
| 5 minutes after forming a sheet on the roll | <3.0 | <3.0 | <3.0 | 3.1 | 3.1 | 3.5 | 3.4 | 3.3 |
| 10 minutes after forming a sheet on the roll | <3.0 | <3.0 | <3.0 | 3.1 | 3.0 | 3.4 | 3.4 | 3.3 |

As is apparent from the results shown in Tables 1, 2 and 3, vinyl chloride type resin compositions in which are incorporated small amounts of dialkyl esters of citric acid according to this invention have excellent lubricating properties and they can retain appropriate lubricating properties even after being processed for 10 minutes at a high temperature such as 190°C. Accordingly, the vinyl chloride type resin compositions of this invention are very satisfactory from the practical viewpoint.

EXAMPLE 2

In the composition shown in Table 3 of Example 1, namely, the composition comprising 100 g of the polyvinyl chloride resin and 3 g of dibutyl tin maleate, in place of the 0.6 g of a lubricant there was used 1 g of dimyristyl citrate (sample No. 26) or 1 g of dipalmityl citrate (sample No. 27). The compositions were processed under the same conditions as in Example 1 and tested according to the method described in Example 1. As a result, it was found that when 1.0 part of dimyristyl citrate or dipalmityl citrate was incorporated, per 100 parts of resin (PHR), the rating marks of the release characteristics were within a range of from 3.4 to 3.5 in each case, namely 3 minutes, 5 minutes and 10 minutes after winding on the roll. Thus, it was found that the above citric acid esters have excellent lubricating effects. For comparison, the same tests were conducted on samples containing the above citric acid esters in amounts of 0.02 parts/PHR and 10 parts/PHR. It was found that when the amount of the lubricant was 0.02 parts/PHR, the mark was 1.0 at 10 minutes after winding on the roll and the lubricating effect was very low, and that when the lubricant was incorporated in an amount of 10 parts/PHR, no practical advantageous lubricating effect was obtained as compared with the case where the lubricant was incorporated in an amount of 1.0 parts/PHR.

The embodiments of this invention in which an exclusive property or privilege is claimed are defined as follows:

1. A vinyl chloride resin composition having incorporated therein, as lubricant, from 0.05 to 2.0 parts by weight, per 100 parts of vinyl chloride resin, of a dialkyl citrate in which the two alkyl groups contain a total of 26 to 44 carbon atoms and each alkyl group contains from 12 to 22 carbon atoms, said vinyl chloride resin being selected from the group consisting of polyvinyl chloride, copolymers containing at least 50 weight percent of vinyl chloride units and the balance is units of one or more monomers copolymerizable with vinyl chloride, and polymer blends containing at least 80 weight percent of polyvinyl chloride and the balance being another polymer compatible with polyvinyl chloride.

2. A composition according to claim 1 wherein said vinyl chloride resin is selected from the group consisting of polyvinyl chloride, vinyl chloride/vinyl ester copolymer, vinyl chloride/vinyl ether copolymer, vinyl chloride/vinylidine chloride copolymer, vinyl chloride/lower olefin copolymer, a resin blend of polyvinyl chloride as a major component and a minor component selected from the group consisting of MBS resin, ABS resin, styrene/acrylonitrile compolymer, styrene/methyl methacrylate copolymer and polystyrene.

3. A resin composition according to claim 2 wherein said vinyl chloride resin is polyvinyl chloride.

4. A resin composition according to claim 2 wherein said vinyl choride resin is a blend of a major proportion of polyvinyl chloride and a minor proportion of MBS resin.

5. A resin composition according to claim 2 wherein said lubricant is a member of the group consisting of dibehenyl citrate, distearyl citrate, and myristyl lauryl citrate.

6. In a method of forming a vinyl chloride molded article which comprises molding a vinyl chloride resin by calendaring or extrusion molding in the thermoplastic state, the improvement which comprises incorporating into said resin, as lubricant, prior to molding, from 0.02 to 2.0 parts, per 100 parts of said resin, of a dialkyl citrate in which the alkyl groups contain a total of 26 to 44 carbon atoms and each alkyl group contains from 12 to 22 carbons atoms, said vinyl chloride resin being selected from the group consisting of polyvinyl chloride, copolymers containing at least 50 weight percent of vinyl chloride units and the balance is units of one or more monomers copolymerizable with vinyl chloride, and polymer blends containing at least 80 weight percent of polyvinyl chloride and the balance being another polymer compatible with polyvinyl chloride.

* * * * *